United States Patent
Choi et al.

(10) Patent No.: US 8,042,998 B2
(45) Date of Patent: Oct. 25, 2011

(54) METHOD FOR DETECTING FAULT OF OIL TEMPERATURE SENSOR FOR AUTOMATIC TRANSMISSION

(75) Inventors: Young-Sun Choi, Gunpo-si (KR); Sung-Teag Cho, Gunpo-si (KR); Yoon-Sang Yoon, Gunpo-si (KR); Hyong-Kyu Kim, Gunpo-si (KR); Jang-Sun Sim, Gunpo-si (KR)

(73) Assignee: Kefico Corporation, Gyeonggi-do (KR)

( * ) Notice: Subject to any disclaimer, the term of this patent is extended or adjusted under 35 U.S.C. 154(b) by 874 days.

(21) Appl. No.: 10/585,558

(22) PCT Filed: Sep. 7, 2004

(86) PCT No.: PCT/KR2004/002270
§ 371 (c)(1),
(2), (4) Date: Apr. 2, 2008

(87) PCT Pub. No.: WO2005/066525
PCT Pub. Date: Jul. 21, 2005

(65) Prior Publication Data
US 2008/0253429 A1      Oct. 16, 2008

(30) Foreign Application Priority Data
Jan. 7, 2004 (KR) .................. 10-2004-0000960

(51) Int. Cl.
*G01B 7/00* (2006.01)
*G01K 7/00* (2006.01)
*G01F 11/00* (2006.01)

(52) U.S. Cl. .......... 374/144; 374/102; 374/57; 374/163; 374/183; 702/185; 701/34

(58) Field of Classification Search ............. 374/100, 374/141, 142, 144, 152, 163, 183, 166, 137, 374/29, 208, 4, 5, 1, 45, 110, 112, 115, 101, 374/102, 148, 57; 702/99, 130, 182, 185; 73/114.68, 114.77, 766; 123/41.01, 41.05, 123/41.12, 41.13, 41.15, 350, 359, 378; 701/34, 701/97, 31, 62, 29; 165/42, 58, FOR. 101; 324/713, 718, FOR. 104, 378, 500, 754.01
See application file for complete search history.

(56) References Cited

U.S. PATENT DOCUMENTS
5,555,500 A * 9/1996 Ogawa et al. .................. 701/36
(Continued)

FOREIGN PATENT DOCUMENTS
DE         197 24 651 A1       12/1997
(Continued)

*Primary Examiner* — Gail Verbitsky
(74) *Attorney, Agent, or Firm* — Merchant & Gould P.C.

(57) ABSTRACT

A method for detecting a fault of an oil temperature sensor of an automatic transmission by using a determining means for detecting the fault of the oil temperature sensor. The method includes any one or more of the steps of 1) determining the fault of the oil temperature sensor by comparing minimum and maximum output values of the oil temperature sensor in every driving mode, 2) determining the fault of the oil temperature sensor by detecting abnormal excessive increase and decrease of the oil temperature for a specific duration, 3) determining the fault the oil temperature sensor in the stuck state in the driving mode when transmission oil temperature increases, and 4) determining the fault of the oil temperature sensor by detecting the oil temperature exceeding a predetermined temperature based on the time when the engine is left at a stopped state.

8 Claims, 9 Drawing Sheets

U.S. PATENT DOCUMENTS

| | | | |
|---|---|---|---|
| 5,824,889 A * | 10/1998 | Park et al. .................. 73/114.55 |
| 5,830,106 A | 11/1998 | Abe |
| 5,848,381 A * | 12/1998 | Ishii et al. ....................... 702/99 |
| 5,895,117 A * | 4/1999 | Wuertenberger ............. 374/142 |
| 5,920,617 A * | 7/1999 | Berger et al. ................. 379/169 |
| 5,995,887 A | 11/1999 | Hathaway et al. |
| 6,434,476 B1 * | 8/2002 | Zagone ......................... 701/115 |
| 6,449,538 B1 * | 9/2002 | Kubo et al. ..................... 701/30 |
| 6,644,850 B2 * | 11/2003 | Kuhn et al. ................... 374/145 |
| 6,980,904 B2 * | 12/2005 | Gosho et al. .................. 701/113 |
| RE39,845 E * | 9/2007 | Hasfjord et al. .............. 340/438 |
| 7,380,983 B2 * | 6/2008 | Bayerle et al. ............... 374/144 |
| 7,470,059 B2 * | 12/2008 | Yoshida et al. ............... 374/102 |
| 7,534,033 B2 * | 5/2009 | Prinz et al. ................... 374/144 |
| 7,862,230 B2 * | 1/2011 | Borgmann et al. ........... 374/141 |
| 7,930,077 B2 * | 4/2011 | Hamama et al. ................ 701/34 |
| 2006/0149441 A1 * | 7/2006 | Takamura ....................... 701/34 |
| 2008/0018326 A1 * | 1/2008 | Ohshima et al. .............. 324/160 |
| 2009/0168832 A1 * | 7/2009 | Bauerle ............................. 374/1 |
| 2009/0216464 A1 * | 8/2009 | Kong et al. ..................... 702/25 |
| 2009/0234533 A1 * | 9/2009 | Trinkner ......................... 701/31 |
| 2010/0195693 A1 * | 8/2010 | Kitajima ........................... 374/1 |

FOREIGN PATENT DOCUMENTS

| | | |
|---|---|---|
| JP | 2003-294128 | 10/2003 |
| JP | 2004-011869 | 1/2004 |
| KR | 10-2003-0040600 A | 5/2003 |

* cited by examiner

[Fig. 1]
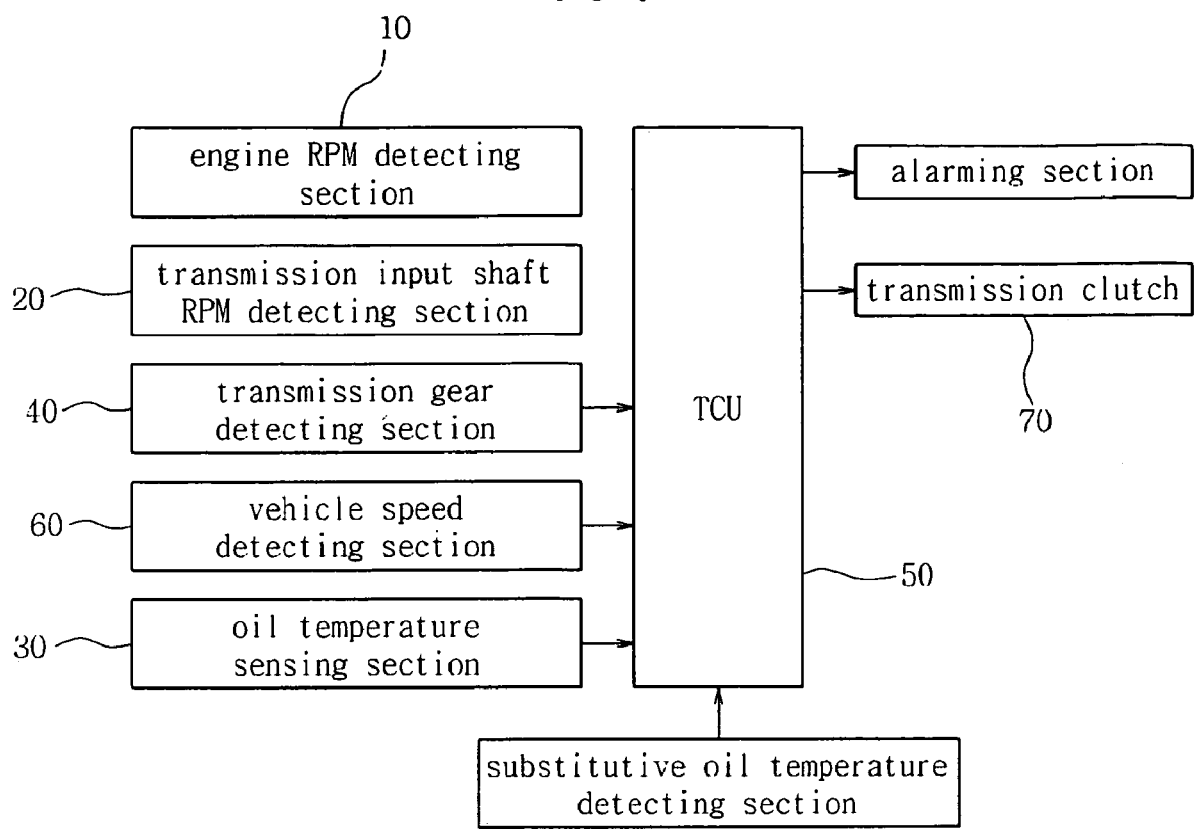

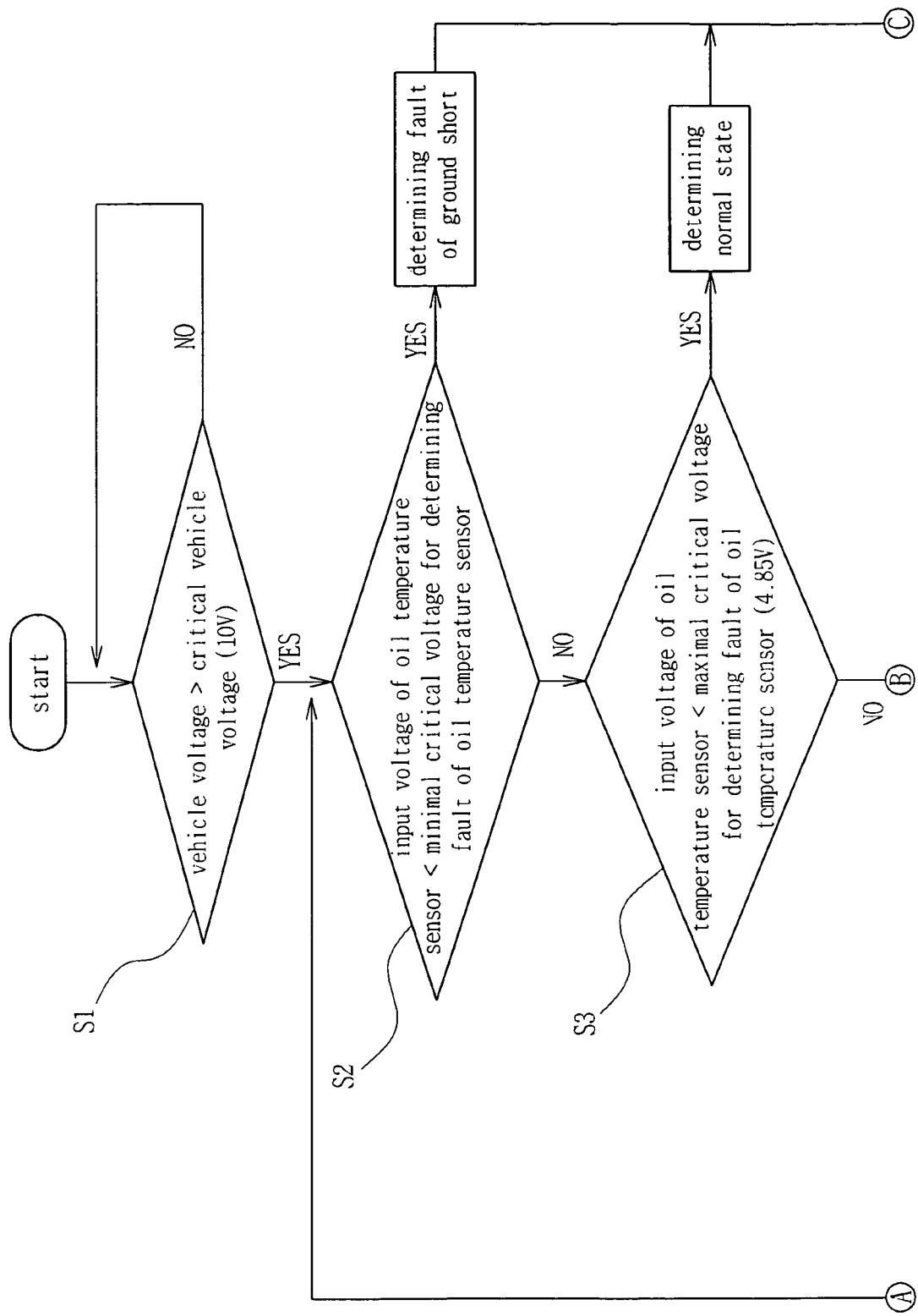
[Fig. 2]

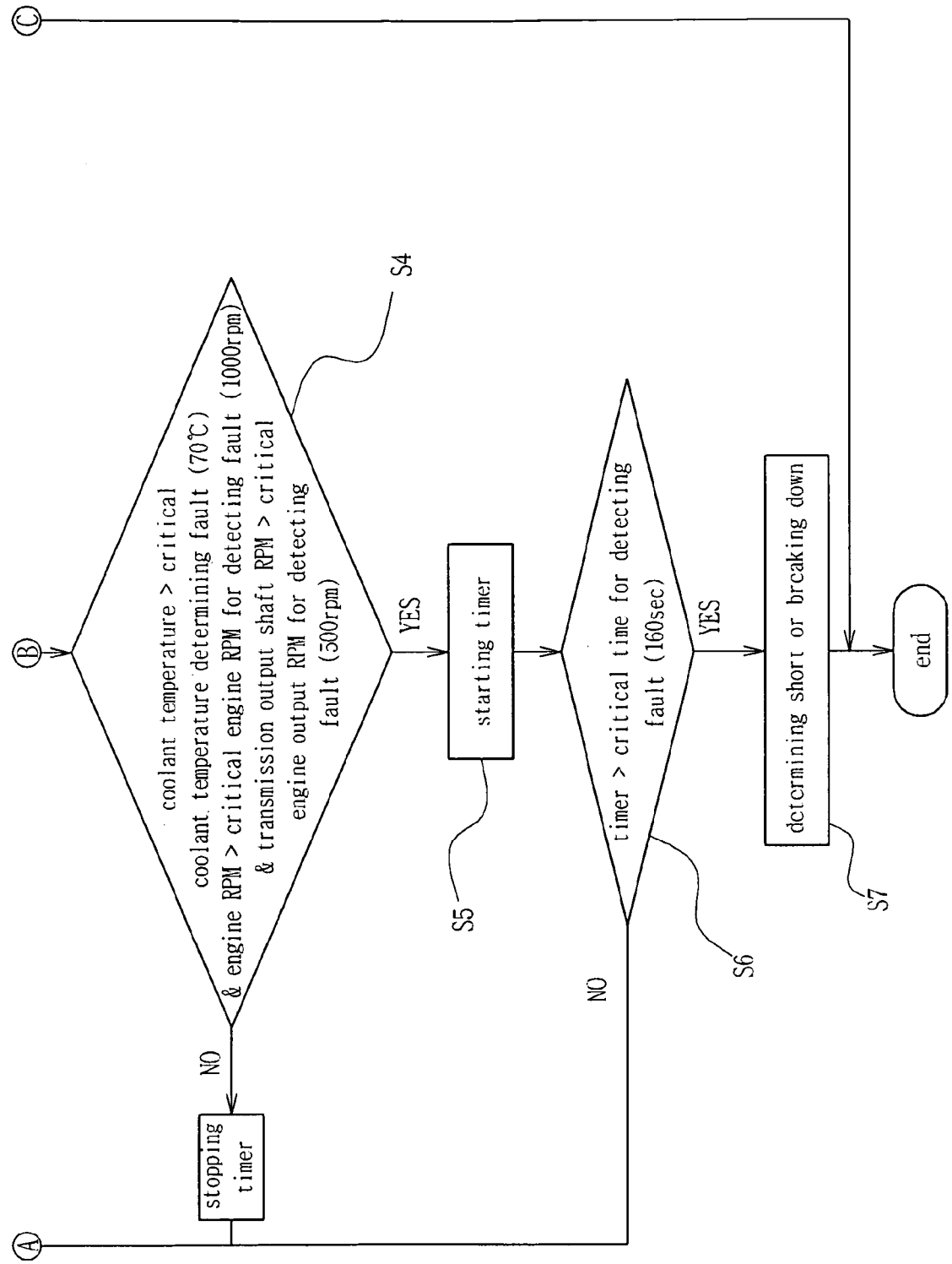
[Fig. 3]

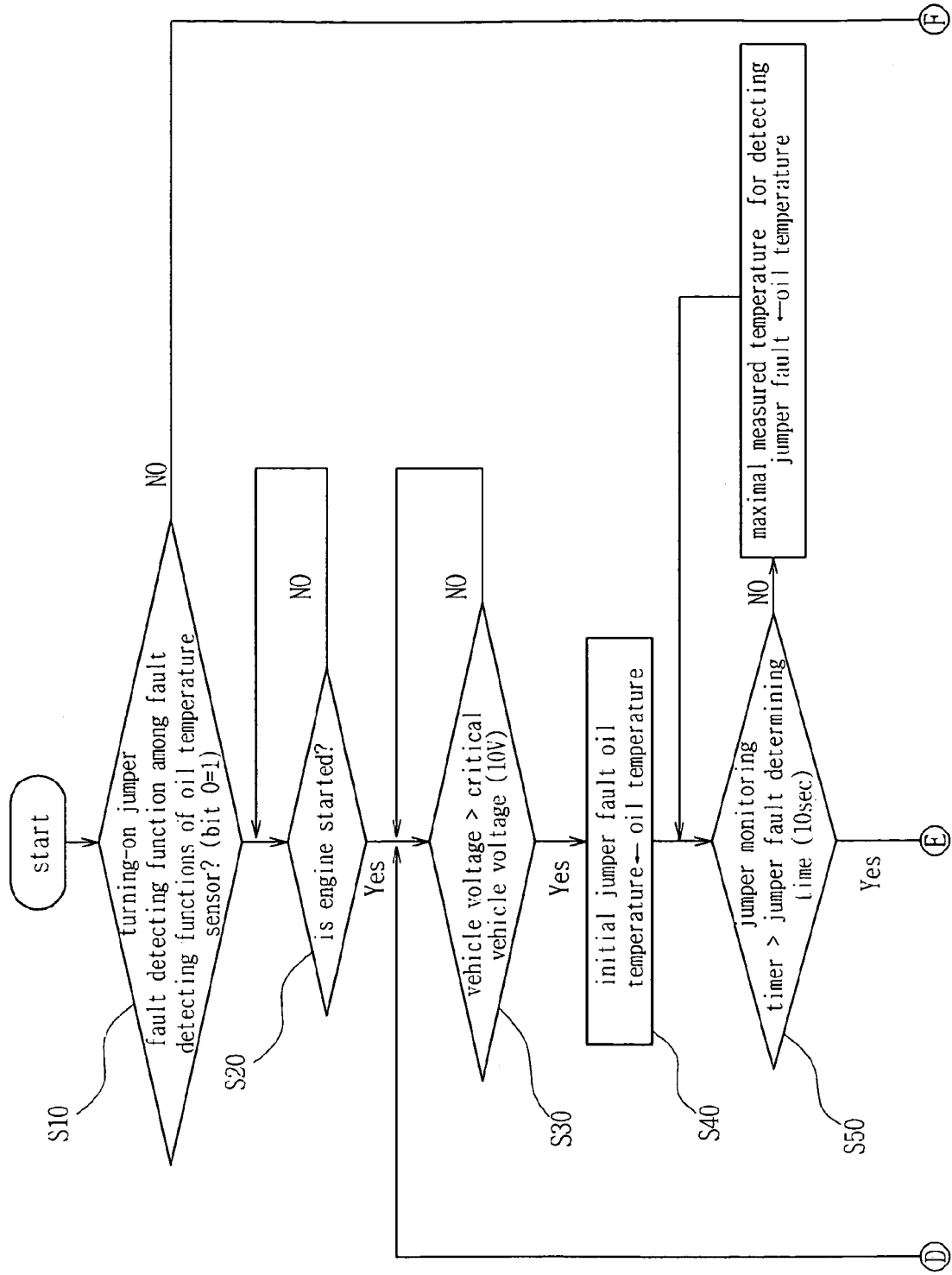
[Fig. 4]

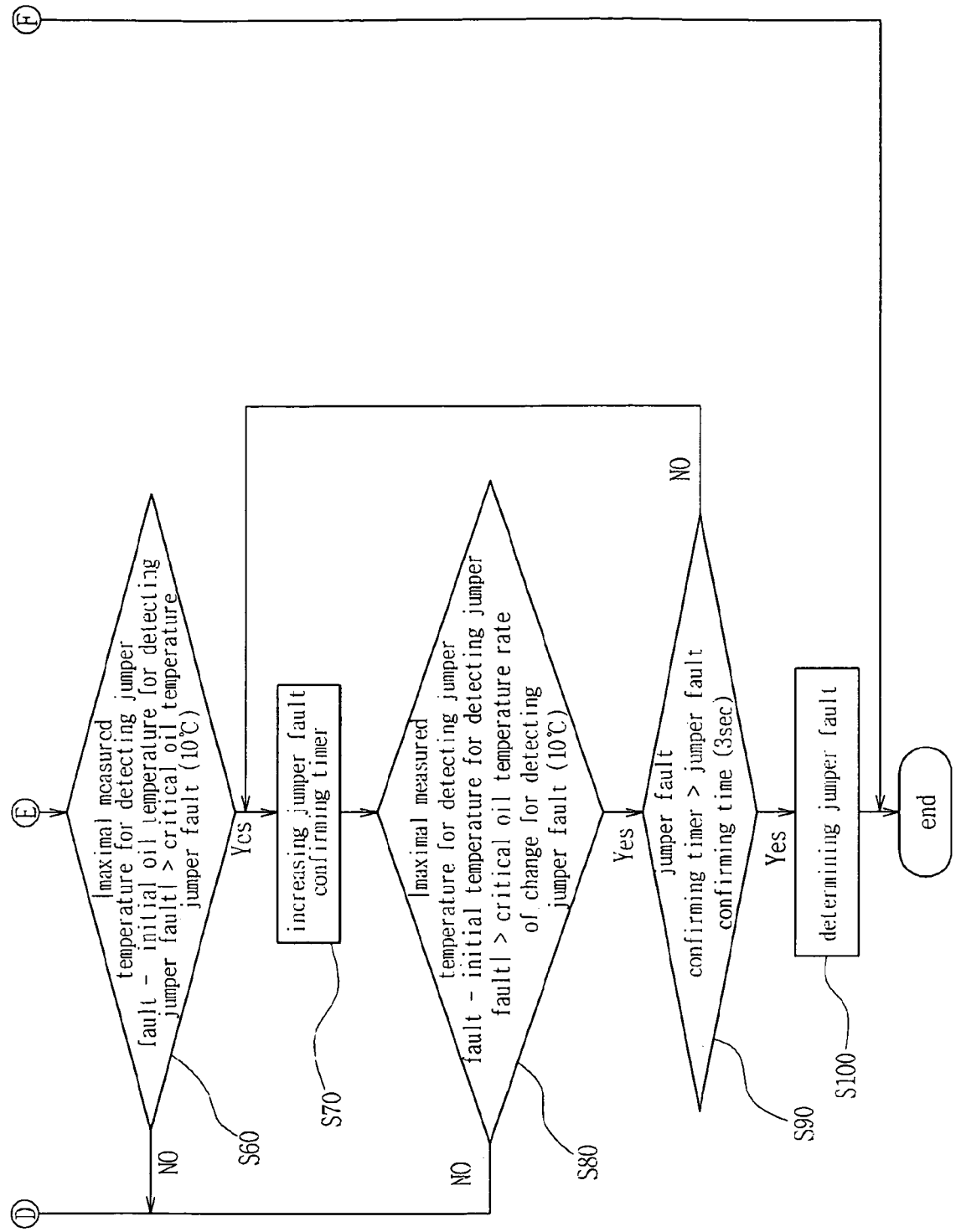
[Fig. 5]

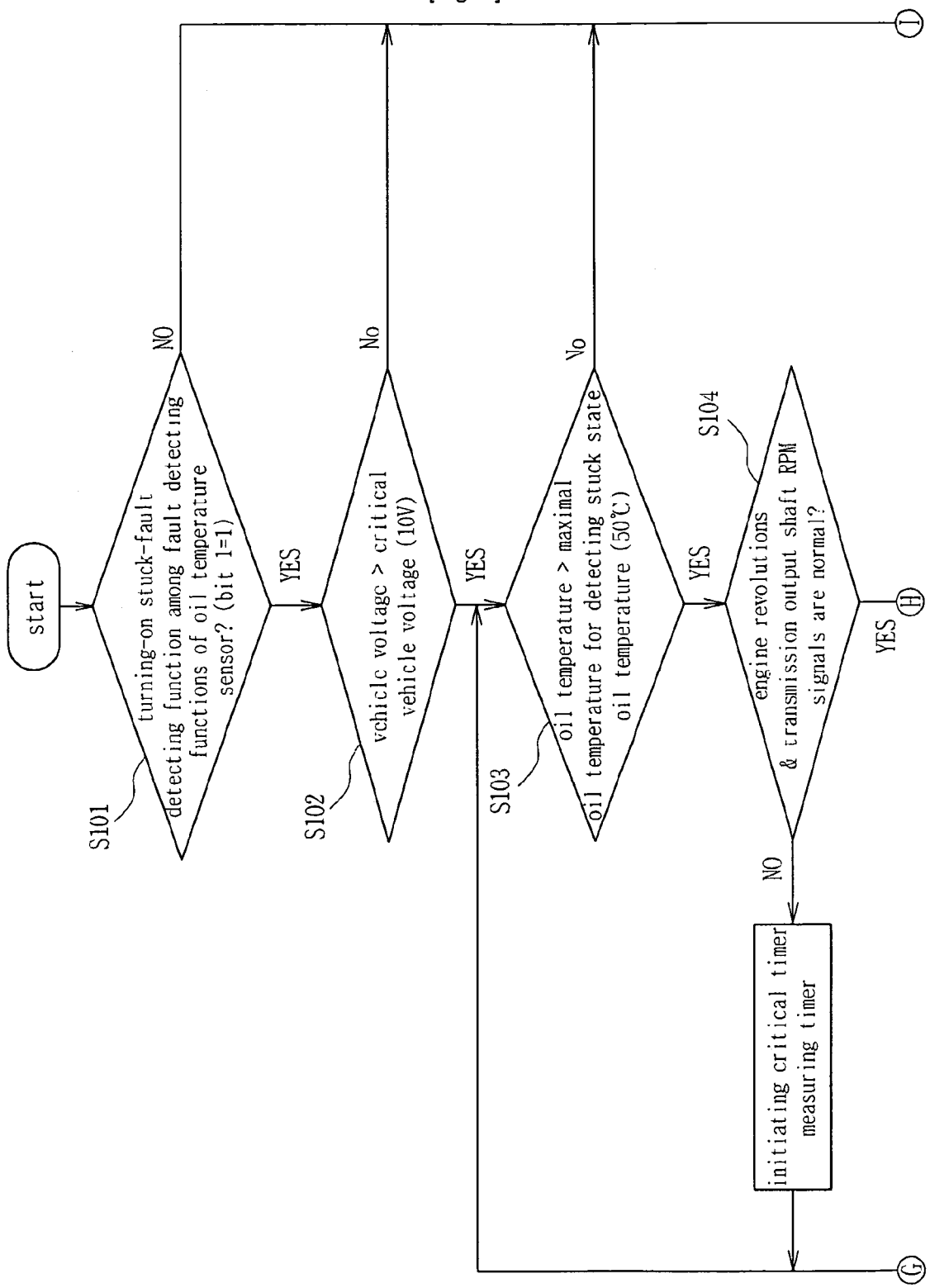
[Fig. 6]

[Fig. 7]
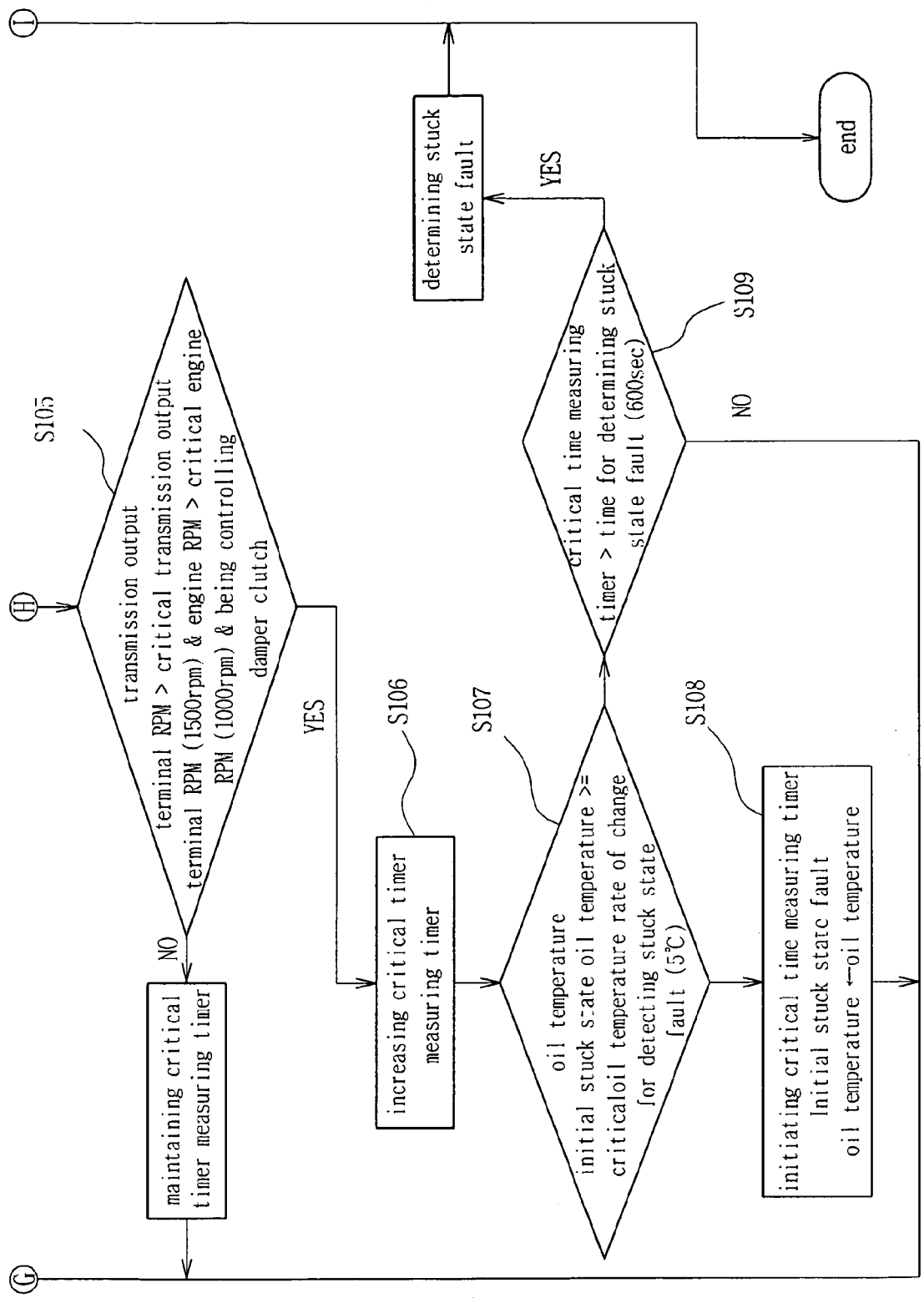

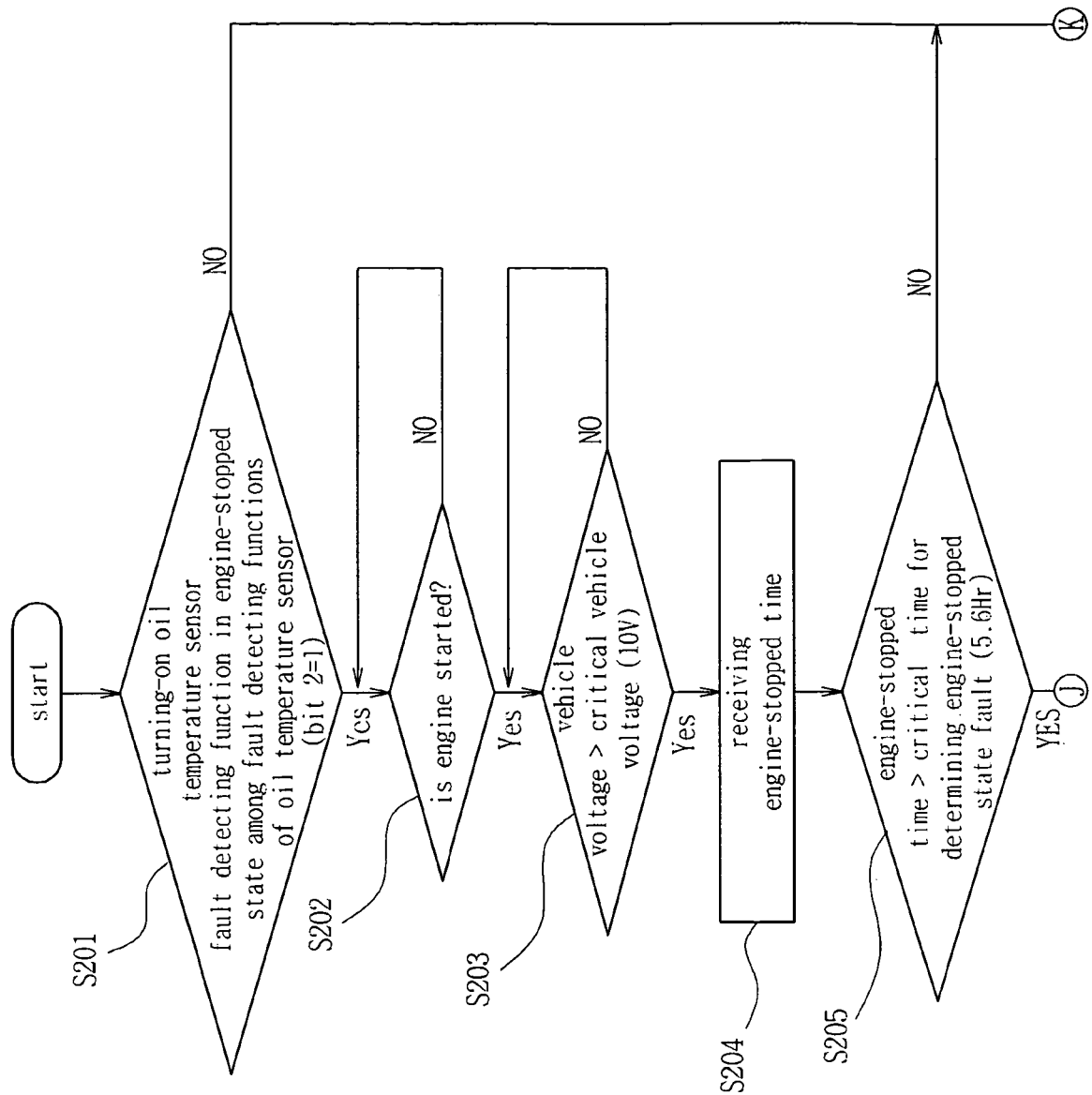
[Fig. 8]

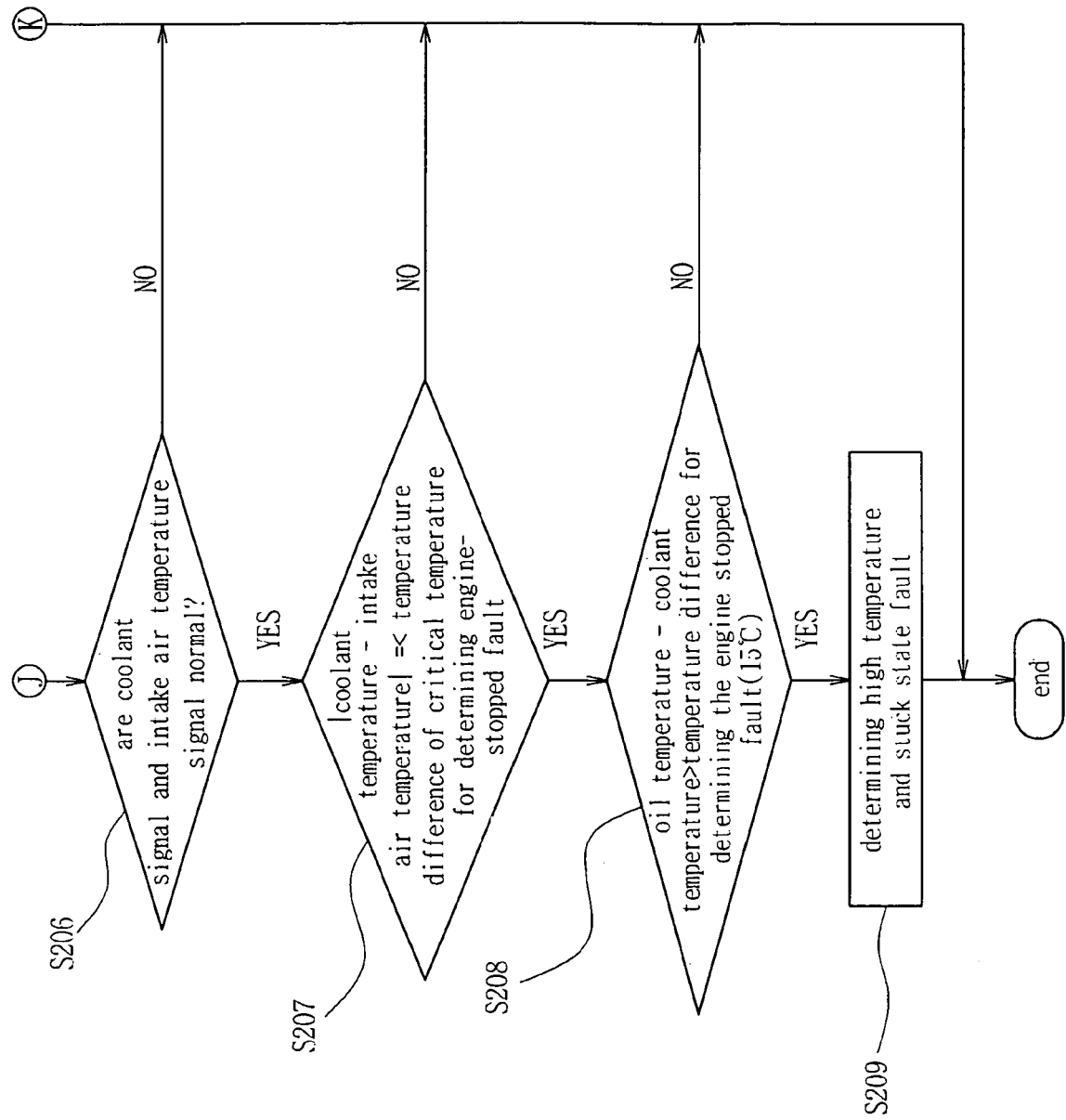

METHOD FOR DETECTING FAULT OF OIL TEMPERATURE SENSOR FOR AUTOMATIC TRANSMISSION

TECHNICAL FIELD

The present invention relates to a method for detecting a fault of an oil temperature sensor for an automatic transmission, and more particularly to a method for precisely determining other faults of the automatic transmission due to the fault of the oil temperature sensor by detecting an appropriate temperature of a transmission oil and decreasing the shock when changing speed of a vehicle by calculating a substituted oil temperature when the oil temperature sensor is out of order by using an estimated oil temperature in every driving node of the vehicle.

BACKGROUND ART

A vehicle is installed with a variety of sensors and a controller. The controller may generate false alarms by detecting the operating state of an engine directly after the engine has been started or when a transient condition occurs such as when the pressure of fluids in the engine is rapidly increased.

Regardless of operating modes of the specific engine of the vehicle, since the vehicle installed with an automatic transmission is affected by the oil temperature and the viscosity change of the transmission oil, the hydraulic pressure of the automatic transmission is controlled based on the oil temperature of the automatic transmission oil measured by the oil temperature sensor when the vehicle speed changes.

In order to control overall operations of the automatic transmission by using a transmission control unit (TCU), the automatic transmission includes solenoid valves, installed to a valve body, for controlling the transmission oil passages and the oil temperature sensor. The hydraulic pressure is compensated according to the oil temperature changes by adjusting control signals applied to the solenoid valves alter detection of the oil temperature of the automatic transmission by the oil temperature sensor.

However, since the conventional art is restricted to determination of an electrical fault of the oil temperature sensor for detecting the oil temperature of the automatic transmission, a driver cannot easily manage the situation when the oil temperature sensor has a fault.

Moreover, since the conventional art does not provide a function for detecting the appropriate oil temperature in the valves, wrong information due to the fault of the oil temperature sensor can be utilized as the conditions for determining whether the automatic transmission has a fault or not. For this reason, other faults can be incorrectly detected.

DISCLOSURE OF INVENTION

Technical Problem

Therefore, the present invention has been made in view of the above problems, and it is an object of the present invention to provide a method for detecting a fault of an oil temperature sensor of an automatic transmission, and for exactly processing abnormal diagnosis signals of the oil temperature sensor according to circumstances when the fault of the oil temperature sensor occurs, so as to prevent miscontrol and the resulting discomfort which the user experiences due to the miscontrol.

Technical Solution

In accordance with an aspect of the present invention, the above and other objects can be accomplished by the provision of a method for detecting a fault of an oil temperature sensor for a hydraulic controller of an automatic transmission by using an apparatus including an engine revolutions per minute (RPM) detecting section 10, a transmission input shaft RPM detecting section 20, an oil temperature sensing section 30, a transmission control unit (TCU) 50, and a transmission clutch 70.

The engine RPM detecting section 10 detects RPM of a vehicle's engine and generates an electric signal based on the detected RPM of the vehicle's engine. The transmission input shaft RPM detecting section 20 detects engine RPM and generates an electric signal based on the detected driving RPM. The oil temperature sensing section 30 detects oil temperature of the automatic transmission and generates an electric signal based on the detected oil temperature. The transmission control unit (TCU) 50 receives the electric signals from the engine RPM detecting section 10 and the transmission input shaft RPM detecting section 20. The TCU 50 determines the state of the engine based on the received electric signals and determines the state of the oil temperature sensor, and generates a transmission clutch control signal corresponding to the determined state. The transmission clutch 70 is operated by the signals from the TCU 50 and is driven through suitable hydraulic pressure. The method includes any one or more of the steps of 1) determining whether there is a fault of the oil temperature sensor by comparing a minimum output value of the oil temperature sensor with a maximum output value of the oil temperature sensor in every driving node, 2) determining whether there is a fault in the oil temperature sensor by detecting abnormal excessive increase and decrease of the oil temperature for a specific duration, 3) determining whether there is a fault in the oil temperature sensor in the stuck state in the driving mode where transmission oil temperature increases, and 4) determining whether there is a fault in the oil temperature sensor by detecting that the oil temperature exceeding a predetermined temperature when the oil temperature decreases after the engine is stopped.

ADVANTAGEOUS EFFECTS

As described above, according to the present invention, a variable indicating the oil temperature, to be considered when controlling the transmission clutch, is detected. When the detected oil temperature exceeds a predetermined value, the detected temperature is stored in a memory even after the engine is stopped. The value of the detected oil temperature is stored as oil temperature in the state of setting the predetermined oil temperature and releasing the predetermined oil temperature when a transmission clutch is operated. Therefore, the transmission clutch can be operated without malfunction even where the atmospheric temperature is extremely changed.

According to the present invention, it an abnormal situation is caused by short, breaking, or abnormal characteristics of the oil temperature sensor when controlling the hydraulic pressure of the automatic transmission in the cold region, the miscontrol of the hydraulic pressure of the automatic transmission can be prevented by precisely processing the abnormal diagnosis signals of the oil temperature sensor according to the abnormal situation, so that the driver can drive the vehicle without difficulty in controlling the automatic transmission.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

DESCRIPTION OF DRAWINGS

The above and other objects, features and other advantages of the present invention will be more clearly understood frau the following detailed description taken in conjunction with the accompanying drawings, in which:

FIG. 1 is a block diagram illustrating an apparatus for detecting a fault in an oil temperature sensor of an automatic transmission utilized in the present invention;

FIG. 2 and FIG. 3 are a flow chart illustrating a method for determining whether there is a fault in an oil temperature sensor in every driving mode;

FIG. 4 and FIG. 5 are a flow chart illustrating a method for determining whether there is a fault in an oil temperature sensor by detecting abnormal excessive increase or decrease from normal oil temperature;

FIG. 6 and FIG. 7 are a flow chart illustrating a method for determining whether there is a fault in an oil temperature sensor in the stuck state; and FIG. 8 and FIG. 9 are a flow chart illustrating a method for determining whether there is a fault in an oil temperature sensor by detecting an oil temperature when the engine is turned off.

BEST MODE

Hereinafter, a method for detecting a fault of an oil temperature sensor for a hydraulic controller of an automatic transmission according to a preferred embodiment of the present invention will be described as follows.

FIG. 1 is a block diagram illustrating an apparatus for detecting a fault of an oil temperature sensor of an automatic transmission employed in the present invention. The apparatus includes an engine RPM detecting section 10, a transmission input shaft RPM detecting section 20, an oil temperature sensing section 30, a transmission control unit (TCU) 50, and a transmission clutch 70.

The engine RPM detecting section 10 detects RPM of a vehicle's engine and generates an electric signal based on the detected RPM of the vehicle's engine. The transmission input shaft RPM detecting section 20 detects driving RPM and generates an electric signal based on the detected driving RPM. The oil temperature sensing section 30 detects oil temperature of the automatic transmission and generates an electric signal based on the detected oil temperature. The transmission control unit (TCU) 50 receives the electric signals from the engine RPM detecting section 10 and the transmission input shaft RPM detecting section 20. The TCU 50 determines the state of the engine based on the received electric signals and determines the state of the oil temperature sensor, and generates a transmission clutch control signal corresponding to the determined state. The transmission clutch 70 is operated by a hydraulic pressure corresponding to the signals from the TCU 50.

The apparatus prevents the miscontrol of the hydraulic pressure of the automatic transmission by precisely processing the abnormal diagnostic signals of the oil temperature sensor according to the abnormal situation, when an abnormal situation occurs, so that the miscontrol and the resulting discomfort which the user experiences due to the miscontrol are prevented.

The engine RPM detecting section 10 detects the RPM of the vehicle's engine and generates an electric signal according to the detected RPM. The transmission input shaft RPM detecting section 20 detects the driving RPM and generates the electric signal according to the detected driving RPM.

The oil temperature sensing section 30 detects the oil temperature of the automatic transmission and generates the electric signal according to the detected oil temperature. The TCU 50 receives the electric signals from the engine RPM detecting section 10 and the transmission input shaft RPM detecting section 20 and determines the state of the engine based on the received electric signals. The TCU 50 determines the state of the oil temperature sensor by receiving the electric signal from the oil temperature sensing section 30, and generates the transmission clutch control signal corresponding to the determined state.

The transmission clutch 70 is operated by the hydraulic pressure corresponding to the signals from the TCU 50.

The TCU 50 receives signals from a transmission gear detecting section 40 for detecting the state of change of speed of the automatic transmission and a vehicle speed detecting section 60 for detecting a vehicle's speed.

In the preferred embodiment of the present invention, excessive increase or decrease of signals from the oil temperature sensor and a stuck state fault are detected. Abnormal oil temperatures when the engine is turned off and oil temperature in each driving node are estimated, so that the estimated oil temperatures are respectively used as substitutive oil temperatures when determining whether the oil temperature sensor has a fault or not, or when the oil temperature sensor has a fault.

FIG. 2 and FIG. 3 are a flow chart illustrating a method for determining whether there is a fault of an oil temperature sensor in each driving mode.

As shown in FIG. 2 and FIG. 3, the method for detecting a fault of an oil temperature sensor for a hydraulic controller of an automatic transmission by using a determining means for detecting a fault of the oil temperature sensor based on temperature changes of transmission oil according to driving modes, includes the steps of S1) detecting a vehicle voltage inputted to the oil temperature sensor and comparing the detected vehicle voltage with a critical vehicle voltage (10V), S2) detecting an input voltage of the oil temperature sensor and comparing the detected input voltage of the oil temperature sensor with a lowest critical temperature (0.1V) S3) comparing the input voltage of the oil temperature sensor with a highest critical voltage (4.85V), S4) comparing the temperature of the engine coolant, RPM of the engine, and RPM of an output shaft of the automatic transmission with respective corresponding critical values, S6) comparing a timer with a critical time for detecting a fault, and S7) determining that there is a fault in the oil temperature sensor due to a short of the oil temperature sensor or a shut-off of electric power.

In the step S1), the vehicle voltage inputted to the oil temperature sensor is compared with the critical vehicle voltage (10V). If the vehicle voltage inputted to the oil temperature sensor is less than the critical vehicle voltage (10V), an initial state is started again. If the detected vehicle voltage is greater than the critical vehicle voltage (10V), it is determined that the oil temperature sensor is normal and an input voltage inputted to the oil temperature sensor is compared with a lowest critical voltage (0.1V) for determining whether there is a fault of the oil temperature sensor (Step S2).

The input voltage of the oil temperature sensor is compared with the lowest critical voltage (0.1V) in the step S1). If the input voltage of the oil temperature sensor is less than the lowest critical voltage (0.1V), it is determined that there is a fault in the oil temperature sensor due to a ground short and all procedures are terminated. If the input voltage of the oil temperature sensor is greater than the lowest critical voltage (0.1V), the input voltage of the oil temperature sensor is compared with a highest critical voltage (4.85V) for detecting the fault of the oil temperature sensor (Step S3).

In the step S3), if the input voltage of the oil temperature sensor is less than the highest critical voltage for detecting the fault of the oil temperature sensor, it is determined that the oil temperature sensor is normal and all procedures are terminated. If the input voltage of the oil temperature sensor is greater than the highest critical voltage for detecting the fault of the oil temperature sensor, temperature of engine coolant, RPM of the engine, and RPM of an output shaft of the automatic transmission are compared with respective corresponding critical values for detecting the fault (Step S4).

In the step S4), the coolant temperature is compared with a critical coolant temperature (70 degrees centigrade). Also, the RPM of the engine is compared with a critical engine RPM (1000 rpm) for detecting a fault of a RPM speed of the engine, and the RPM of an output shaft of the automatic transmission is compared with a critical RPM (500 rpm) of the RPM of the output shaft of the automatic transmission.

As the result of the comparison, if all detected values do not exceed critical values, the timer is stopped and initiated, and the step S2) is repeated. If all detected values exceed critical values, the TCU 50 increases the timer and the timer is compared with the lowest critical voltage (0.1V) for detecting the fault of the oil temperature sensor (Step S6).

In the step S6), if the timer is less than the critical time for detecting the fault of the oil temperature sensor, the step S2) is repeated. If the timer is greater than the critical time for detecting the fault of the oil temperature sensor, it is determined that there is a fault due to the short in the oil temperature sensor or a shut-off of the electric power (Step S7) and all procedures are terminated.

FIG. 4 and FIG. 5 are a flow chart illustrating a method for determining whether there is a fault of an oil temperature sensor by detecting abnormal excessive increase or decrease of an oil temperature.

As shown in FIG. 4 and FIG. 5, the method for detecting a fault of an oil temperature sensor of an automatic transmission by using a determining means for detecting the fault of the oil temperature sensor based on instant temperature changes per unit time of the automatic transmission, includes the steps of S10) displaying (bit 0=1) enabling/disabling modes of a jumper fault detecting function among fault detecting functions for the oil temperature sensor, S20) confirming whether the engine is started or not, S30) comparing the vehicle voltage with the critical vehicle voltage (10V), S40) receiving present oil temperature as an initial oil temperature for detecting the fault of the oil temperature sensor, S50) comparing a jump monitoring timer with a jumper fault determining time, S60) comparing a value of subtracting initial oil temperature for detecting a jumper fault from a maximal measured oil temperature for determining the jumper fault with a critical oil temperature rate of change for determining the jumper fault, S70) increasing a jumper fault confirming timer, S80) comparing the difference between the maximal measured oil temperature for determining the jumper fault and the initial oil temperature for detecting the jumper fault with the critical oil temperature rate of change (10 degrees centigrade) for determining the jumper fault, S90) comparing the jumper fault confirming timer with a jumper fault confirming time, and S100) determining that there is a fault of the oil temperature sensor.

In the step S10), the enabling/disabling modes of a jumper fault detecting function among fault detecting functions for the oil temperature sensor are displayed (bit 0=1). In the step S10), if the disabling mode (bit 0=0) of the jumper fault detecting function is selected, all procedures are terminated. If the enabling mode (bit 0=1) of the jumper fault detecting function is selected, it is confirmed whether the engine has been started or not (Step S20). If the engine has not been started, the step of confirming whether the engine has been started or not is repeated (Step S20). If the engine has been started, the vehicle voltage is compared with the critical vehicle voltage (10V) (Step S30). In the step S30), if the vehicle voltage is less than the critical vehicle voltage, the step of comparing the vehicle voltage with the critical vehicle voltage (10V) is repeated. If the vehicle voltage is greater than the critical vehicle voltage, the TCU 50 receives the present oil temperature as the initial oil temperature for detecting the fault in order to compare oil temperature changes per unit time (Step S40).

If the jump monitoring timer is less than the jumper fault determining time, the TCU 50 reads the maximal measured oil temperature of the jumper fault for determining the fault of the oil temperature sensor. The maximal measured oil temperature is measured by detecting the temperature rate of change. At this time, the TCU 50 receives the oil temperature of the automatic transmission and the step of comparing the jump monitoring timer with the jumper fault determining time is repeated. When the jump monitoring timer is greater than the jumper fault determining time, the value of subtracting the initial oil temperature from the maximal measured oil temperature is compared with the critical oil temperature rate of change for determining the jumper fault (Step S60).

In the step S60), when the difference between the maximal measured oil temperature and the initial oil temperature is less than the critical oil temperature rate of change, the step of comparing the vehicle voltage with the critical vehicle voltage (10V) is repeated. If the difference between the maximal measured oil temperature and the initial oil temperature is greater than the critical oil temperature rate of change, the jumper fault confirming timer is increased (Step S70).

In the step S80), if the difference between the maximal measured oil temperature and the initial oil temperature is less than the critical oil temperature rate of change for determining the jumper fault, the vehicle voltage is compared with the critical vehicle voltage (10V). If the difference between the maximal measured oil temperature and the initial oil temperature is greater than the critical oil temperature rate of change for determining the jumper fault, the jumper fault confirming timer is compared with the jumper fault confirming time (Step S90).

If the jumper fault confirming timer is less than a fault confirming time (3 sec) for determining a fault of the oil temperature sensor by detecting the temperature rate of change, the step of increasing the jumper fault confirming timer is repeated. If the jumper fault confirming timer is greater than a fault confirming time (3 sec) for determining fault of the oil temperature, it is determined that there is fault of the oil temperature sensor (Step S100), and all procedures are terminated.

FIG. 6 and FIG. 7 are a flow chart illustrating a method for detecting a fault of an oil temperature sensor of an automatic transmission by using a determining means for detecting the fault of the oil temperature sensor in the stuck state of a detected signal of the oil temperature sensor in a driving mode where transmission oil temperature increases.

As shown in FIG. 6 and FIG. 7, the method for detecting a fault of an oil temperature sensor of an automatic transmission by using a determining means for detecting the fault of the oil temperature sensor in the stuck state of a detected signal of the oil temperature sensor in a driving mode where transmission oil temperature increases, includes the steps of S101) confirming whether enabling (bit 1=1)/disabling (bit 1=0) modes of a stuck fault detecting function among fault detecting functions of the oil temperature sensor are displayed, S102) comparing a vehicle voltage with a critical vehicle voltage (10V), S103) comparing the transmission oil temperature with a maximal transmission oil temperature (50 degrees centigrade) for determining the fault of the oil temperature sensor in the stuck state, S104) confirming whether signals of engine RPM and RPM of an output shaft of the automatic transmission are normal or not, S105) determining whether a clutch is under control or not, S106) increasing a critical time measuring timer for detecting the fault of the oil temperature sensor at the stuck state, S107) comparing a value of subtracting initial oil temperature for detecting the stuck fault from the transmission oil temperature with a critical oil temperature rate of change (5 degrees centigrade) for determining the fault of the oil temperature sensor in the stuck state, S108) initiating the critical time measuring timer and setting the oil temperature of the transmission oil as an initial oil temperature for detecting the stuck fault, and S109) comparing the critical time measuring timer with the critical time for determining the fault of the oil temperature sensor in the stuck state.

In the step S101), if the disabling node (bit 1=0) of the stuck fault detecting function is selected, all procedures are terminated. If the enabling mode (bit 1=1) of the stuck fault detecting function is selected, the vehicle voltage is compared with the critical vehicle voltage (10V) (Step S102).

In the step S102), if the vehicle voltage is less than the critical vehicle voltage, all procedures are terminated. If the vehicle voltage is greater than the critical vehicle voltage, the transmission oil temperature is compared with the maximal transmission oil temperature (50 degrees centigrade) for determining the fault of the oil temperature sensor in the stuck state Step S103).

In the step S103), if the transmission oil temperature is greater than the maximal transmission oil temperature (50 degrees centigrade), all procedures are terminated. If the transmission oil temperature is less than the maximal transmission oil temperature (50 degrees centigrade), it is confirmed whether the signals of engine RPM and RPM of an output shaft of the automatic transmission are normal or not (step S104).

In the step S104), if the signals of engine RPM and RPM of an output shaft of the automatic transmission are abnormal, the critical time measuring timer is initialed, and the step S103) is repeated. If the signals of engine RPM and RPM of an output shaft of the automatic transmission are normal, RPM of the output shaft of the automatic transmission is compared with critical RPM (500 rpm) of an output shaft of the automatic transmission for determining the fault of the oil temperature sensor in the stuck state (Step S105). In the step S105), engine RPM is compared with critical engine RPM (1000 rpm) for determining the fault of the oil temperature sensor in the stuck state, and it is determined whether the clutch is under the control or not.

In the step S105), if both RPM of the output shaft and engine RPM do not exceed the critical RPM and the critical engine RPM, the critical time measuring timer is maintained, and the Step S103) is repeated. If both RPM of the output shaft and engine RPM exceed the critical RPM and the critical engine RPM, the critical time measuring timer is increased by the TCU 50 (step S106).

In the step S107), the value of subtracting initial oil temperature for detecting the stuck fault from the transmission oil temperature is compared with the critical oil temperature rate of change (5 degrees centigrade) for determining the fault of the oil temperature sensor in the stuck state.

In the step S107), if the value of subtracting initial oil temperature from the transmission oil temperature is greater than the critical oil temperature rate of change (5 degrees centigrade), the critical time measuring timer is initiated and the oil temperature of the transmission oil is set to an initial oil temperature for detecting the stuck fault (Step S108). Then, the step S103) is repeated.

If the value of subtracting initial oil temperature from the transmission oil temperature is less than the critical oil temperature rate of change (5 degrees centigrade), the critical time measuring timer is compared with the critical time for determining the fault of the oil temperature sensor in the stuck state (Step S109).

In the step S109), if the critical time measuring timer is less than the critical time, the step S103) is repeated. If the critical time measuring timer is greater than the critical time, it is determined that there is the fault of the oil temperature sensor in the stuck state (Step S109), and all procedures are terminated.

FIG. 8 and FIG. 9 are a flow chart illustrating a method for detecting a fault of an oil temperature sensor of an automatic transmission by detecting oil temperature of the automatic transmission based on how long the engine has been turned off by using a determining means for detecting the fault of the oil temperature sensor.

As shown in FIG. 8 and FIG. 9, the method for detecting a fault of an oil temperature sensor of an automatic transmission by detecting oil temperature of the automatic transmission based on how long the engine has been turned off by using a determining means for detecting the fault of the oil temperature sensor, includes the steps of S201) confirming whether enabling (bit 2=1)/disabling (bit 2=0) modes of the oil temperature sensor fault detecting function in the state when the engine is stopped at room temperature for a long time, among fault detecting functions of the oil temperature sensor, are displayed or not, S202) confirming whether the engine has been started or not, S203) comparing a vehicle voltage with a critical vehicle voltage (10V), S204) receiving time of keeping the engine stopped at room temperature, S205) comparing the time of keeping the engine stopped at room temperature with a critical keep-in time for determining a fault of the oil temperature sensor in the engine stopped state, S206) confirming whether a temperature signal of engine coolant and a temperature signal of intake-air are normal or not, S207) comparing the difference between the temperature of the engine coolant and the temperature of the intake-air with a temperature difference for determining the engine stopped fault, S208) comparing the difference between the oil temperature and the coolant temperature with the temperature difference for determining the engine stopped fault, and S209) determining a high temperature stuck fault.

In the step S201), it is confirmed whether enabling (bit 2=1)/disabling (bit 2=0) modes are displayed or not. In the step S201), if the disabling mode (bit 2=0) is selected, all procedures are terminated. If the enabling mode (bit 2=1) is selected, it is confirmed whether the engine has been started or not (Step S202).

In the step S202), if the engine has not been started, the step S202) is repeated. If the engine has been started, the vehicle voltage is compared with the critical vehicle voltage (10V) Step S203).

In the step S203), if the vehicle voltage is less than the critical vehicle voltage (10V), the vehicle voltage is compared with the critical vehicle voltage (10V) again. If the vehicle voltage is greater than the critical vehicle voltage (10V), the TCU 50 receives the time indicating how long the engine has been stopped at room temperature (Step S204), and the engine-stopped time is compared with the critical engine-stopped time (Step S205).

In the step S205), if the engine-stopped time is less than the critical engine-stopped time, all procedures are terminated. If the engine-stopped time is greater than the critical engine-stopped time, it is confirmed whether the temperature signal of engine coolant and the temperature signal of intake-air are normal or not (Step S206).

In the step S206), if the temperature signal of engine coolant and the temperature signal of intake-air are abnormal, all procedures are terminated. If the temperature signal of engine coolant and the temperature signal of intake-air are normal, the difference between the temperature of the engine coolant and the temperature of the intake-air are compared with the temperature difference for determining the engine-stopped fault (Step S207).

In the step S207), if the difference between the temperature of the engine coolant and the temperature of the intake-air are greater than the temperature difference for determining the engine-stopped fault, all procedures are terminated. If the difference between the temperature of the engine coolant and the temperature of the intake-air are less than the temperature difference for determining the engine-stopped fault, the difference between the oil temperature and the coolant temperature are compared with a temperature difference for determining the engine-stopped fault (Step S208).

In the step S208), if the difference between the oil temperature and the coolant temperature is less than the temperature difference for determining the engine-stopped fault, all procedures are terminated. If the difference between the oil temperature and the coolant temperature are greater than the temperature difference for determining the engine-stopped fault, it is determined that there is a high temperature stuck fault in the oil temperature sensor (Step S209).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for detecting a fault of an oil temperature sensor for a hydraulic controller of an automatic transmission by using a determining means for detecting a fault of the oil temperature sensor based on temperature changes of the oil according to a driving mode, the method comprising the steps of:
   a) detecting a vehicle voltage inputted to the oil temperature sensor and comparing the detected vehicle voltage with a critical vehicle voltage;
   b) detecting an input voltage of the oil temperature sensor and comparing the detected input voltage of the oil temperature sensor with a lowest critical temperature, step b) comprising the sub-steps of:
      b1) repeating an initial state when the vehicle voltage inputted to the oil temperature sensor is less than the critical vehicle voltage;
      b2) determining that the oil temperature sensor is normal when the detected vehicle voltage is greater than the critical vehicle voltage; and
      b3) comparing an input voltage inputted to the oil temperature sensor with a lowest critical voltage for determining whether there is a fault of the oil temperature sensor;
   c) comparing the input voltage of the oil temperature sensor with a highest critical voltage; step c) comprising the sub-steps of:
      c1) determining that there is a fault in the oil temperature sensor due to a ground short when the input voltage of the oil temperature sensor is less than the lowest critical voltage and terminating all procedures; and
      c2) comparing the input voltage of the oil temperature sensor with a highest critical voltage for detecting the fault of the oil temperature sensor when the input voltage of the oil temperature sensor is greater than the lowest critical voltage;
   d) comparing temperature of coolant of an engine, revolutions per minute (RPM) of the engine, and RPM of an output shaft of the automatic transmission with respective corresponding critical values; step d) comprising the sub-steps of:
      d1) determining that the oil temperature sensor is normal when the input voltage of the oil temperature sensor is less than the highest critical voltage for detecting the fault of the oil temperature sensor, and terminating all procedures;
      d2) comparing temperature of coolant of an engine, RPM of the engine, and RPM of an output shaft of the automatic transmission with respective corresponding critical values for detecting the fault when the input voltage of the oil temperature sensor is greater than the highest critical voltage for detecting the fault of the oil temperature sensor; and
      d3) comparing the RPM of the engine with a critical engine RPM for detecting a fault of a RPM speed of the engine, and the RPM of an output shaft of the automatic transmission with a critical RPM of the RPM of the output shaft of the automatic transmission;
   e) comparing a timer with a critical time for detecting a fault; step e) comprising the sub-steps of:
      e1) stopping and initiating the timer when all detected values do not exceed the critical values, and repeating b);
      e2) increasing the timer when all detected values exceed the critical values; and
      e3) comparing the timer with the lowest critical voltage for detecting the fault of the oil temperature sensor; and
   f) determining that there is a fault in the oil temperature sensor due to a short of the oil temperature sensor or a shut-off of electric power, step f) comprising the sub-steps of:
      f1) repeating step b) when the timer is less than the critical time for detecting the fault of the oil temperature sensor;
      f2) determining that there is a fault due to the short in the oil temperature sensor or a shut-off of the electric power when the timer is greater than the critical time for detecting the fault of the oil temperature sensor; and
      f3) terminating all procedures.

2. A method for detecting a fault of an oil temperature sensor for a hydraulic controller of an automatic transmission by using a determining means for detecting the fault of the oil temperature sensor in a stuck state of a detected signal of the oil temperature sensor in a driving mode where transmission oil temperature increases, the method comprising the steps of:

a) measuring the transmission oil temperature with the oil temperature sensor;

b) confirming whether enabling/disabling modes of a stuck fault detecting function of the oil temperature sensor are displayed;

c) detecting a vehicle voltage inputted to the oil temperature sensor and comparing the vehicle voltage with a critical vehicle voltage; the step comprising the sub-steps of:
   c1) terminating all procedures when the disabling mode of the stuck fault detecting function is selected; and
   c2) comparing the vehicle voltage with the critical vehicle voltage when the enabling mode of the stuck fault detecting function is selected;

d) comparing the transmission oil temperature with a maximal transmission oil temperature for determining the fault of the oil temperature sensor in the stuck state; step d) comprising the sub-steps of:
   d1) terminating all procedures when the vehicle voltage is less than the critical vehicle voltage; and
   d2) receiving the present oil temperature as the initial oil temperature for detecting the stuck fault and comparing the transmission oil temperature with the maximal transmission oil temperature for determining the fault of the oil temperature sensor in the stuck state when the vehicle voltage is greater than the critical vehicle voltage;

e) confirming whether signals of engine revolutions per minute (RPM) and RPM of an output shaft of the automatic transmission are normal or not; step d) comprising the sub-steps of:
   e1) terminating all procedures when the transmission oil temperature is greater than the maximal transmission oil temperature; and
   e2) confirming whether the signals of engine RPM and RPM of an output shaft of the automatic transmission are normal or not when the transmission oil temperature is less than the maximal transmission oil temperature;

f) determining whether a clutch is under control or not; step f) comprising the sub-steps of:
   f1) initiating the critical time measuring timer and repeating the step when the signals of engine RPM and RPM of an output shaft of the automatic transmission are abnormal, the critical time measuring timer is initiated; and
   f2) comparing RPM of the output shaft of the automatic transmission with critical RPM of an output shaft of the automatic transmission for determining the fault of the oil temperature sensor in the stuck state when the signals of engine RPM and RPM of an output shaft of the automatic transmission are normal;

g) increasing a critical time measuring timer for detecting the fault of the oil temperature sensor at the stuck state; step g) comprising the sub-steps of:
   g1) increasing the critical time measuring timer and repeating the step when both RPM of the output shaft and engine RPM do not exceed the critical RPM and the critical engine RPM; and
   g2) increasing the critical time measuring timer when both RPM of the output shaft and engine RPM exceed the critical RPM and the critical engine RPM;

h) comparing a value obtained by subtracting initial oil temperature for detecting the stuck fault from the transmission oil temperature with a critical oil temperature rate of change for determining the fault of the oil temperature sensor in the stuck state;

i) initiating the critical time measuring timer and setting the oil temperature of the transmission oil as an initial oil temperature for detecting the stuck fault; step i) comprising the sub-steps of:
   i1) initiating the critical time measuring timer when the value of subtracting initial oil temperature from the transmission oil temperature is greater than the critical oil temperature rate of change;
   i2) setting the oil temperature of the transmission oil to an initial oil temperature for detecting the stuck fault; and
   i3) repeating the step; and j) comparing the critical time measuring timer with the critical time for determining the fault of the oil temperature sensor in the stuck state; step j) comprising the sub-steps of:
   j1) comparing the critical time measuring timer with the critical time for determining the fault of the oil temperature sensor in the stuck state when the value of subtracting initial oil temperature from the transmission oil temperature is less than the critical oil temperature rate of change;
   j2) repeating the step when the critical time measuring timer is less than the critical time; and
   j3) determining that there is the fault of the oil temperature sensor in the stuck state when the critical time measuring timer is greater than the critical time.

3. The method as set forth in claim 1, further comprising all the steps of the method for detecting the fault of the oil temperature sensor for the hydraulic controller of the automatic transmission by using the determining means for detecting the fault of the oil temperature sensor based on instant temperature change per unit time of the automatic transmission according to the following steps:

g) displaying enabling/disabling modes of a jumper fault detecting function among fault detecting functions for the oil temperature sensor;

h) confirming whether the engine is started or not; step h) comprising the sub-steps of:
   h1) terminating all procedures when the disabling mode of the jumper fault detecting function is selected; and
   h2) confirming whether the engine has been started or not when the enabling mode bit of the jumper fault detecting function is selected;

i) comparing the vehicle voltage with the critical vehicle voltage;

step i) comprising the sub-steps of:
   i1) repeating the step of confirming whether the engine has been started or not when the engine has not been started; and
   i2) comparing the vehicle voltage with the critical vehicle voltage when the engine has been started;

j) receiving present oil temperature as an initial oil temperature for detecting the fault of the oil temperature sensor; step j) comprising the sub-steps of:
   j1) repeating the step of comparing the vehicle voltage with the critical vehicle voltage when the vehicle voltage is less than the critical vehicle voltage; and
   j2) receiving the present oil temperature as the initial oil temperature for detecting the fault in order to compare oil temperature changes per unit time when the vehicle voltage is greater than the critical vehicle voltage;

k) comparing a time on a jump monitoring timer with a jumper fault determining time;

l) comparing a value obtained by subtracting initial oil temperature for detecting a jumper fault from a maximal measured oil temperature for determining the jumper fault with a critical oil temperature rate of change for determining the jumper fault; step l) comprising the sub-steps of:
  l1) reading the maximal measured oil temperature of the jumper fault for determining the fault of the oil temperature sensor when the jump monitoring timer is less than the jumper fault determining time;
  l2) receiving the oil temperature of the automatic transmission;
  l3) repeating the step of comparing jump monitoring timer with the jumper fault determining time; and
  l4) comparing the value of subtracting the initial oil temperature from the maximal measured oil temperature with the critical oil temperature rate of change for determining the jumper fault when the jump monitoring timer is greater than the jumper fault determining time;
m) increasing time on a jumper fault confirming timer; step m) comprising the sub-steps of:
  m1) repeating the step of comparing the vehicle voltage with the critical vehicle voltage when the difference between the maximal measured oil temperature and the initial oil temperature is less than the critical oil temperature rate of change; and
  m2) increasing the jumper fault confirming timer when the difference between the maximal measured oil temperature and the initial oil temperature is greater than the critical oil temperature rate of change;
n) comparing a difference between the maximal measured oil temperature for determining the jumper fault and the initial oil temperature for detecting the jumper fault with the critical oil temperature rate of change for determining the jumper fault; and
o) comparing the time on the jumper fault confirming timer with a jumper fault confirming time; step o) comprising the sub-steps of:
  o1) comparing the vehicle voltage with the critical vehicle voltage when the difference between the maximal measured oil temperature and the initial oil temperature is less than the critical oil temperature rate of change for determining the jumper fault;
  o2) comparing the jumper fault confirming timer with the jumper fault confirming time when the difference between the maximal measured oil temperature and the initial oil temperature is greater than the critical oil temperature rate of change for determining the jumper fault; and
  o3) repeating the step of increasing the jumper fault confirming timer when the jumper fault confirming timer is less than a fault confirming time for determining fault of the oil temperature sensor by detecting the temperature rate of change; and determining that there is fault of the oil temperature sensor when the jumper fault confirming timer is greater than a fault confirming time for determining fault of the oil temperature.

4. The method as set forth in claim 1, further comprising all the steps of the method for detecting the fault of the oil temperature sensor for the hydraulic controller of the automatic transmission by using the determining means for detecting the fault of the oil temperature sensor at the stuck state of a detected signal of the oil temperature sensor in the driving mode where transmission oil temperature increases according to the following steps:

g) measuring the transmission oil temperature with the oil temperature sensor;
h) confirming whether enabling/disabling modes of a stuck fault detecting function among fault detecting functions of the oil temperature sensor are displayed;
i) comparing the vehicle voltage with the critical vehicle voltage; the step comprising the sub-steps of:
  i1) terminating all procedures when the disabling mode of the stuck fault detecting function is selected; and
  i2) comparing the vehicle voltage with the critical vehicle voltage when the enabling mode of the stuck fault detecting function is selected;
j) comparing the transmission oil temperature with a maximal transmission oil temperature for determining the fault of the oil temperature sensor in the stuck state; step j) comprising the sub-steps of:
  j1) terminating all procedures when the vehicle voltage is less than the critical vehicle voltage; and
  j2) receiving the present oil temperature as the initial oil temperature for detecting the stuck fault and comparing the transmission oil temperature with the maximal transmission oil temperature for determining the fault of the oil temperature sensor in the stuck state when the vehicle voltage is greater than the critical vehicle voltage;
k) confirming whether signals of engine revolutions per minute (RPM) and RPM of an output shaft of the automatic transmission are normal or not; the step k) comprising the sub-steps of
  k1) terminating all procedures when the transmission oil temperature is greater than the maximal transmission oil temperature; and
  k2) confirming whether the signals of engine RPM and RPM of an output shaft of the automatic transmission are normal or not when the transmission oil temperature is less than the maximal transmission oil temperature
l) comparing RPM; step l) comprising the sub-steps of:
  l1) initiating the critical time measuring timer and repeating the step when the signals of engine RPM and RPM of an output shaft of the automatic transmission are abnormal, the critical time measuring timer is initiated; and
  l2) comparing RPM of the output shaft of the automatic transmission with critical RPM of an output shaft of the automatic transmission for determining the fault of the oil temperature sensor in the stuck state when the signals of engine RPM and RPM of an output shaft of the automatic transmission are normal;
m) increasing a critical time measuring timer for detecting the fault of the oil temperature sensor at the stuck state; step m) comprising the sub-steps of:
  m1) increasing the critical time measuring timer and repeating the step when both RPM of the output shaft and engine RPM do not exceed the critical RPM and the critical engine RPM; and
  m2) increasing the critical time measuring timer when both RPM of the output shaft and engine RPM exceed the critical RPM and the critical engine RPM;
n) subtracting a value of initial oil temperature for detecting the stuck fault from the transmission oil temperature with a critical oil temperature rate of change for determining the fault of the oil temperature sensor in the stuck state;

o) initiating the critical time measuring timer and setting the oil temperature of the transmission oil as an initial oil temperature for detecting the stuck fault; step o) comprising the sub-steps of:
   o1) initiating the critical time measuring timer when the value of subtracting initial oil temperature from the transmission oil temperature is greater than the critical oil temperature rate of change;
   o2) setting the oil temperature of the transmission oil to an initial oil temperature for detecting the stuck fault; and
   o3) repeating the step; and
p) comparing the critical time measuring timer with the critical time for determining the fault of the oil temperature sensor in the stuck state; the step comprising the sub-steps of:
   p1) comparing the critical time measuring timer with the critical time for determining the fault of the oil temperature sensor in the stuck state when the value of subtracting initial oil temperature from the transmission oil temperature is less than the critical oil temperature rate of change;
   p2) repeating the step when the critical time measuring timer is less than the critical time; and
   p3) determining that there is the fault of the oil temperature sensor in the stuck state when the critical time measuring timer is greater than the critical time.

5. The method as set forth in claim 1, further comprising all the steps of the method for detecting the fault of the oil temperature sensor for the hydraulic controller of the automatic transmission by detecting the oil temperature of the automatic transmission based on how long the engine has been stopped by using the determining means for detecting the fault of the oil temperature sensor according to the following steps:
   g) confirming whether enabling modes of oil temperature sensor fault detecting function in the state that the engine is turned off at room temperature for an extended time, among fault detecting functions of the oil temperature sensor, are displayed or not;
   h) confirming whether the engine has been started or not; step h) comprising the sub-steps of:
      h1) terminating all procedures if the disabling mode, is terminated; and
      h2) confirming whether the engine has been started or not if the enabling mode is selected;
   i) comparing a vehicle voltage with a critical vehicle voltage; step i) comprising the sub-steps of:
      i1) repeating the step if the engine has not been started; and
      i2) comparing the vehicle voltage with the critical vehicle voltage if the engine has been started;
   j) receiving the time indicating how long the engine has been stopped at room temperature; step j) comprising the sub-steps of:
      j1) comparing the vehicle voltage with the critical vehicle voltage again if the vehicle voltage is less than the critical vehicle voltage; and
      j2) receiving the time indicating how long the engine has been stopped at room temperature;
   k) comparing the time indicating how long the engine has been stopped at room temperature with a critical engine-stopped time for determining a fault of the oil temperature sensor in the engine-stopped state; confirming whether a temperature signal of engine coolant and a temperature signal of intake-air are normal or not; step k) comprising the sub-steps of:
      k1) terminating all procedures if the engine-stopped time is less than the critical engine-stopped time; and
      k2) confirming whether the temperature signal of engine coolant and the temperature signal of intake-air are normal or not when the engine-stopped time is greater than the critical engine-stopped time;
   l) comparing a difference between the temperature of the engine coolant and the temperature of the intake-air with a temperature difference for determining the engine-stopped fault; step l) comprising the sub-steps of:
      l1) terminating all procedures if the temperature signal of engine coolant and the temperature signal of intake-air are abnormal;
      l2) comparing the difference between the temperature of the engine coolant and the temperature of the intake-air with the temperature difference for determining the engine-stopped fault if the temperature signal of engine coolant and the temperature signal of intake-air are normal;
   m) comparing a difference between the oil temperature and the coolant temperature with the temperature difference for determining the engine-stopped fault; step m) comprising the sub-steps of:
      m1) terminating all procedures if the difference between the temperature of the engine coolant and the temperature of the intake-air are greater than the temperature difference for determining the engine-stopped fault;
      m2) comparing the difference between the oil temperature and the coolant temperature with the temperature difference for determining the engine-stopped fault when the difference between the temperature of the engine coolant and the temperature of the intake-air is less than the temperature difference for determining the engine-stopped fault; and
      m3 determining a high temperature stuck fault; step m3) comprising the sub-steps of:
         m31) terminating all procedures when the difference between the oil temperature and the coolant temperature is less than the temperature difference for determining the engine-stopped fault; and
         m32) determining that there is a high temperature stuck fault in the oil temperature sensor when the difference between the oil temperature and the coolant temperature are greater than the temperature difference for determining the engine-stopped fault.

6. The method as set forth in claim 1, further comprising all the steps of the method for detecting a fault of the oil temperature sensor for the hydraulic controller of an automatic transmission by using the determining means for detecting the fault of the oil temperature sensor at the stuck state of a detected signal of the oil temperature sensor in a driving mode where transmission oil temperature increases according to the following steps:
   g) measuring the transmission temperature with the oil temperature sensor;
   h) confirming whether an enabling bit of a stuck fault detecting function of the oil temperature sensor is displayed;
   i) comparing the vehicle voltage with the critical vehicle voltage; step i) comprising the sub-steps of:
      i1) terminating all procedures when the disabling mode of the stuck fault detecting function is selected; and
      i2) comparing the vehicle voltage with the critical vehicle voltage when the enabling mode of the stuck fault detecting function is selected;

j) comparing the transmission oil temperature with a maximal transmission oil temperature for determining the fault of the oil temperature sensor in the stuck state; step j) comprising the sub-steps of:
  j1) terminating all procedures when the vehicle voltage is less than the critical vehicle voltage; and
  j2) comparing the transmission oil temperature with the maximal transmission oil temperature for determining the fault of the oil temperature sensor in the stuck state when the vehicle voltage is greater than the critical vehicle voltage;
k) confirming whether signals of engine revolutions per minute (RPM) and RPM of an output shaft of the automatic transmission are normal or not; step k) comprising the sub-steps of:
  k1) terminating all procedures when the transmission oil temperature is greater than the maximal transmission oil temperature; and
  k2) confirming whether the signals of engine RPM and RPM of an output shaft of the automatic transmission are normal or not when the transmission oil temperature is less than the maximal transmission oil temperature;
l) determining whether a clutch is under control or not; step l) comprising the sub-steps of:
  l1) initiating the critical time measuring timer and repeating the step when the signals of engine RPM and RPM of an output shaft of the automatic transmission are abnormal, the critical time measuring timer is initiated; and
  l2) comparing RPM of the output shaft of the automatic transmission with critical RPM of an output shaft of the automatic transmission for determining the fault of the oil temperature sensor in the stuck state when the signals of engine RPM and RPM of an output shaft of the automatic transmission are normal;
m) increasing a critical time measuring timer for detecting the fault of the oil temperature sensor at the stuck state; step m) comprising the sub-steps of:
  m1) the critical time measuring timer and repeating the step when both RPM of the output shaft and engine RPM do not exceed the critical RPM and the critical engine RPM; and
  m2) increasing the critical time measuring timer when both RPM of the output shaft and engine RPM exceed the critical RPM and the critical engine RPM;
n) subtracting a value of initial oil temperature for detecting the stuck fault from the transmission oil temperature with a critical oil temperature rate of change for determining the fault of the oil temperature sensor in the stuck state,
o) initiating the critical time measuring timer and setting the oil temperature of the transmission oil as an initial oil temperature for detecting the stuck fault; step o) comprising the sub-steps of:
  o1) initiating the critical time measuring timer when the value of subtracting initial oil temperature from the transmission oil temperature is greater than the critical oil temperature rate of change;
  o2) setting the oil temperature of the transmission oil to an initial oil temperature for detecting the stuck fault; and
  o3) repeating the step;
p) comparing the critical time measuring timer with the critical time for determining the fault of the oil temperature sensor in the stuck state; step p) comprising the sub-steps of:
  p1) comparing the critical time measuring timer with the critical time for determining the fault of the oil temperature sensor in the stuck state when the value of subtracting initial oil temperature from the transmission oil temperature is less than the critical oil temperature rate of change;
  p2) repeating the step when the critical time measuring timer is less than the critical time; and
  p3) determining that there is the fault of the oil temperature sensor in the stuck state when the critical time measuring timer is greater than the critical time.

7. The method as set forth in claim 6, further comprising all the steps of the method for detecting the fault of the oil temperature sensor for the hydraulic controller of the automatic transmission by detecting the oil temperature of the automatic transmission based on how long the engine has been stopped by using the determining means for detecting the fault of the oil temperature sensor according to the following steps:
  q) confirming whether enabling modes of oil temperature sensor fault detecting function in the state that the engine is turned off at room temperature for an extended time, are displayed or not;
  r) confirming whether the engine has been started or not; step r) comprising the sub-steps of:
    r1) terminating all procedures if the disabling mode is terminated; and
    r2) confirming whether the engine has been started or not if the enabling mode is selected;
  s) comparing the vehicle voltage with the critical vehicle voltage; step s) comprising the sub-steps of:
    s1) repeating the step if the engine has not been started; and
    s2) comparing the vehicle voltage with the critical vehicle voltage if the engine has been started;
  t) receiving the time indicating how long the engine has been stopped at room temperature; step t) comprising the sub-steps of:
    t1) comparing the vehicle voltage with the critical vehicle voltage again if the vehicle voltage is less than the critical vehicle voltage; and
    t2) receiving the time indicating how long the engine has been stopped at room temperature;
  u) comparing the time indicating how long the engine has been stopped at room temperature with a critical engine-stopped time for determining a fault of the oil temperature sensor in the engine-stopped state;
  v) confirming whether a temperature signal of engine coolant and a temperature signal of intake-air are normal or not; step v) comprising the sub-steps of:
    v1) terminating all procedures if the engine-stopped time is less than the critical engine-stopped time; and
    v2) confirming whether the temperature signal of engine coolant and the temperature signal of intake-air are normal or not when the engine-stopped time is greater than the critical engine-stopped time;
  w) comparing a difference between the temperature of the engine coolant and the temperature of the intake-air with a temperature difference for determining the engine-stopped fault; step w) comprising the sub-steps of:
    w1) terminating all procedures if the temperature signal of engine coolant and the temperature signal of intake-air are abnormal; and
    w2) comparing the difference between the temperature of the engine coolant and the temperature of the intake-air with the temperature difference for determining the engine-stopped fault if the temperature signal of engine coolant and the temperature signal of intake-air are normal;

x) comparing a difference between the oil temperature and the coolant temperature with a temperature difference for determining the engine-stopped fault; step x) comprising the sub-steps of:
  x1) terminating all procedures if the difference between the temperature of the engine coolant and the temperature of the intake-air are greater than the temperature difference for determining the engine-stopped fault;
  x2) comparing the difference between the oil temperature and the coolant temperature with the temperature difference for determining the engine-stopped fault when the difference between the temperature of the engine coolant and the temperature of the intake-air is less than the temperature difference for determining the engine-stopped fault; and
  x3) determining a high temperature stuck fault; step x3) comprising the sub-steps of:
    x31) terminating all procedures when the difference between the oil temperature and the coolant temperature is less than the temperature difference for determining the engine-stopped fault; and
    x32) determining that there is a high temperature stuck fault in the oil temperature sensor when the difference between the oil temperature and the coolant temperature are greater than the temperature difference for determining the engine-stopped fault.

8. The method as set forth in claim 3, further comprising all the steps of the method for detecting the fault of the oil temperature sensor for the hydraulic controller of the automatic transmission by detecting the oil temperature of the automatic transmission based on how long the engine has been stopped by using the determining means for detecting the fault of the oil temperature sensor according to the following steps:

p) confirming whether enabling modes of oil temperature sensor fault detecting function in the state that the engine is turned off at room temperature for an extended time, are displayed or not;

q) confirming whether the engine has been started or not; step b) comprising the sub-steps of:
  q1) terminating all procedures if the disabling mode is terminated; and
  q2) confirming whether the engine has been started or not if the enabling mode is selected;

r) comparing the vehicle voltage with the critical vehicle voltage; step r) comprising the sub-steps of:
  r1) repeating the step if the engine has not been started; and
  r2) comparing the vehicle voltage with the critical vehicle voltage if the engine has been started;

s) receiving a time indicating how long the engine has been stopped at room temperature; step s) comprising the sub-steps of:
  s1) comparing the vehicle voltage with the critical vehicle voltage again if the vehicle voltage is less than the critical vehicle voltage; and
  s2) receiving the time indicating how long the engine has been stopped at room temperature;

t) comparing the time indicating how long the engine has been stopped at room temperature with a critical engine-stopped time for determining a fault of the oil temperature sensor in the engine-stopped state;

u) confirming whether a temperature signal of engine coolant and a temperature signal of intake-air are normal or not; step u1) comprising the sub-steps of:
  u1) terminating all procedures if the engine-stopped time is less than the critical engine-stopped time; and
  u2) confirming whether the temperature signal of engine coolant and the temperature signal of intake-air are normal or not when the engine-stopped time is greater than the critical engine-stopped time;

v) comparing a difference between the temperature of the engine coolant and the temperature of the intake-air with a temperature difference for determining the engine-stopped fault; step v) comprising the sub-steps of:
  v1) terminating all procedures if the temperature signal of engine coolant and the temperature signal of intake-air are abnormal; and
  v2) comparing the difference between the temperature of the engine coolant and the temperature of the intake-air with the temperature difference for determining the engine-stopped fault if the temperature signal of engine coolant and the temperature signal of intake-air are normal;

w) comparing a difference between the oil temperature and the coolant temperature with a temperature difference for determining the engine-stopped fault; step w) comprising the sub-steps of:
  w1) terminating all procedures if the difference between the temperature of the engine coolant and the temperature of the intake-air are greater than the temperature difference for determining the engine-stopped fault;
  w2) comparing the difference between the oil temperature and the coolant temperature with the temperature difference for determining the engine-stopped fault when the difference between the temperature of the engine coolant and the temperature of the intake-air is less than the temperature difference for determining the engine-stopped fault; and
  w3) determining a high temperature stuck fault; step w3) comprising the sub-steps of:
    w31) terminating all procedures when the difference between the oil temperature and the coolant temperature is less than the temperature difference for determining the engine-stopped fault; and
    w32) determining that there is a high temperature stuck fault in the oil temperature sensor when the difference between the oil temperature and the coolant temperature are greater than the temperature difference for determining the engine-stopped fault.

* * * * *